H. CAVE.
AUTOGENOUS WELDING TRAINER.
APPLICATION FILED DEC. 31, 1917.
1,286,529.
Patented Dec. 3, 1918.
2 SHEETS—SHEET 1.
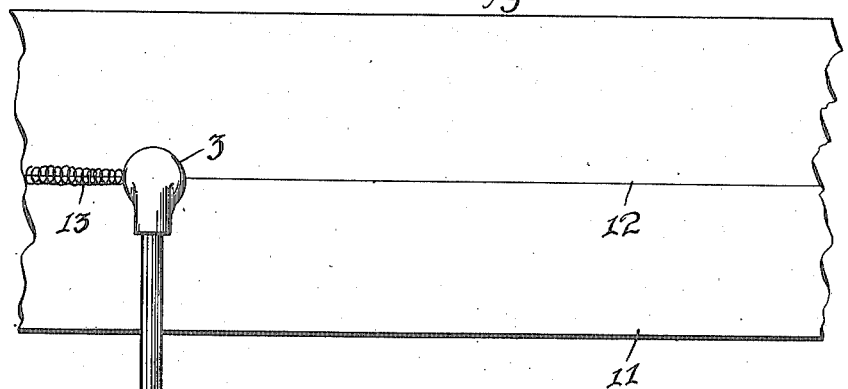
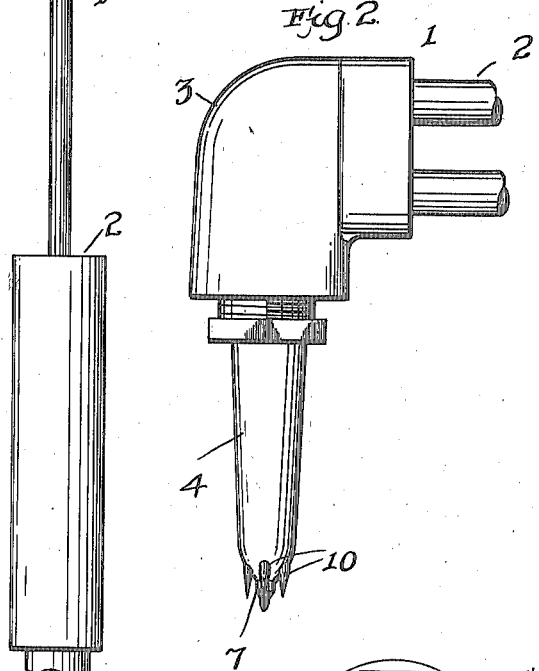
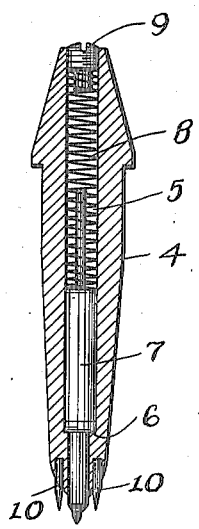
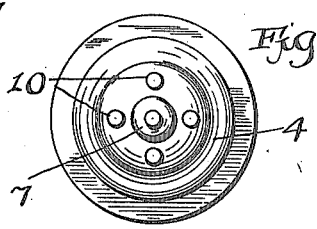
INVENTOR
Henry Cave
BY
ATTORNEY

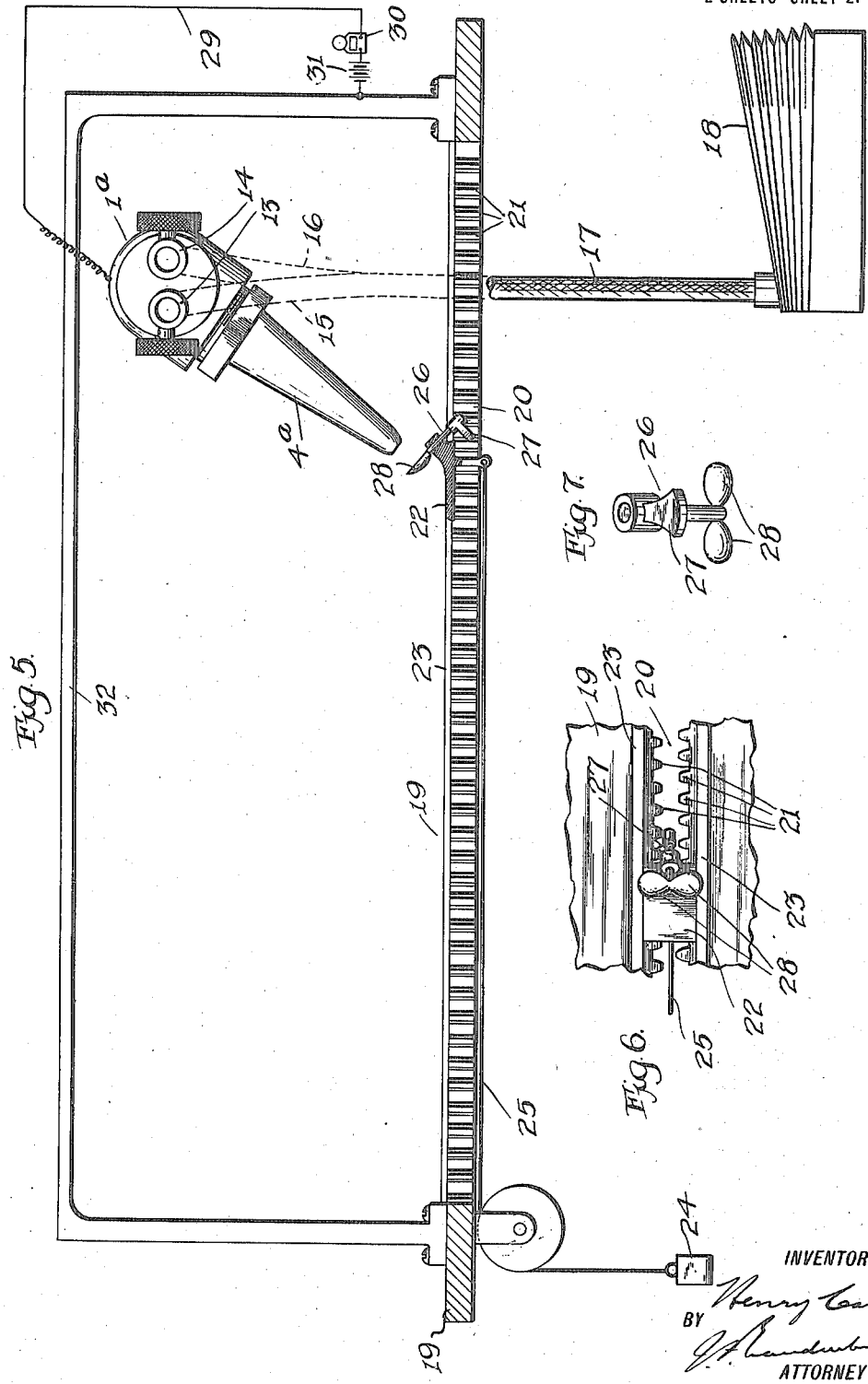

UNITED STATES PATENT OFFICE.

HENRY CAVE, OF ELIZABETH, NEW JERSEY, ASSIGNOR TO DAVIS-BOURNONVILLE COMPANY, OF NEW YORK, N. Y., A CORPORATION OF NEW YORK.

AUTOGENOUS-WELDING TRAINER.

1,286,529.  Specification of Letters Patent.  Patented Dec. 3, 1918.

Application filed December 31, 1917.  Serial No. 209,639.

*To all whom it may concern:*

Be it known that I, HENRY CAVE, a citizen of the United States, and a resident of Elizabeth, in the county of Union and State of New Jersey, have invented new and useful Improvements in Autogenous-Welding Trainers, of which the following is a specification.

The purpose of this invention is to provide means for economical and efficient instruction of those learning the art of hand welding by the oxy-acetylene or autogenous flame process. In making these welds it is necessary to operate with the tip, which is located at the end of a handle, at a definite distance from the work, and to advance it with precision as the weld proceeds, this movement comprising a transverse back and forth component as well as the general movement lengthwise of the weld. The manipulation calls for a degree of muscle control in the arm which is not easy to attain, and which if mastered before the beginner is permitted to do actual welding would save a substantial amount of material and gas. As far as I am aware I am the first to provide practice apparatus of this character, the same comprising a torch, either actual or dummy, though preferably the latter, and means for apprising the operator in event of variation from the proper movement and distance of the tip from the supposed work. Two preferred embodiments of the invention are shown by way of illustration.
In the drawings:

Figure 1 is a plan view of a torch member and record sheet, the latter representing the plane of the work;

Fig. 2 is an enlarged side elevation of the head and tip of the torch member;

Fig. 3 is a longitudinal section through the dummy tip;

Fig. 4 is an end view thereof on a still larger scale;
Fig. 5 is a sectional side elevation of another embodiment;

Fig. 6 is a plan view of an escapement means forming a part thereof; and

Fig. 7 is a perspective view of the escapement member.

Figs. 1 and 2 show a member 1 having the conventional size, weight, balance and form of a welding torch. The handle 2 and head 3 may in fact be those of an actual torch.
The dummy tip 4, which may be secured to the head in the usual detachable manner, is also of conventional form. Instead of the usual gas passages, however, it is formed with an enlarged bore 5 reduced and shouldered toward the front, as indicated at 6. In this bore is placed a pencil or marker 7, which is pressed forward by a spring 8 to a degree of projection determined by the coöperation of the stop 6 with a shoulder on the pencil. A screw plug 9 in the rear end of the bore holds the spring under compression and permits the same and the pencil to be removed.

The extent to which the pencil or marking point projects from the end of the tip represents the distance which should be maintained between the extremity of the tip and the work in actual practice. Surrounding the marking point are a number of sharp prongs 10, secured rigidly to the tip and having their ends slightly above the plane of the marking point.

This form of the training apparatus is adapted to be used in conjunction with a sheet of soft paper 11, upon which may be ruled a line 12 to represent the median line of the supposed weld. In the use of the device the pupil grasps the torch member in the regular way and endeavors to progress the tip along the line, keeping it at the required distance and executing one of the standard movements, such as the continuous circular movement represented at 13 upon the sheet. If the tip is allowed to recede from the work plane, this is indicated by the failure of the marking point to leave a trace. On the other hand, if the tip is depressed the prongs will stick into the paper, interrupting the progress. The character of the marking shows how closely the operator approximates to the proper movement. With this construction not only is the pupil aware of his performance, but a record is made which may be judged by an instructor.

In Fig. 5 the torch member 1ª has a tip 4ª, having passages which may be the same as those of a regular torch tip, one of which may indeed be used for the purpose. The pipes 13 and 14 of the handle are cut off by the plane of the section, but it will be understood that it is generally similar to that shown in Fig. 1. Suitable connections at its rear end receive the branches 15, 16 of a hose 17 leading from a source of compressed air or gaseous fluid, for example, a bellows pump 18, adapted to be operated by the foot of the pupil. In this way a jet of air is caused to issue from the jet orifice of the tip.

The remainder of the apparatus comprises a table 19, the top of which is understood to be the plane of the work. This table has a slot 20, the direction of which represents the direction of the weld, and the sides of which are provided with suitable escapement teeth 21. Coöperating with this toothed slot is a slide or carriage 22, guided by suitable guides 23 on the table so as to be capable of traveling lengthwise over the slot, as through the agency of a weight 24 and cord 25. Mounted pivotally on the carriage is an escapement member 26, carrying a dog 27 and lateral wings 28 constituting an impingement surface.

An electric circuit 29 containing a bell 30 and battery 31 is completed in event of the tip touching the impingement surface or the head contacting with an overhead bar 32, that is to say whenever the torch swerves too far down or up.

In using this construction the student seeks to move the torch tip back and forth across the line of the supposed weld in such manner as to produce a regular rocking of the escapement member, which causes the carriage to be advanced step-by-step. In following the impingement surface he describes one of the standard welding movements, namely a zig-zag. Any departure from the proper movement will be indicated by the failure of the escapement to operate, and any undue deviation up or down will be advertised by the sounding of the bell. It will be understood that for another type of torch movement a specifically different escapement may be designed.

What I claim as new is:

1. Means for training beginners in the art of autogenous flame welding comprising the combination of a torch member, and means for apprising the operator of variations from the proper movement or distance of the tip from the plane of the supposed weld.

2. Means of the character described comprising a dummy torch tip having a spring-pressed marker and one or more adjacent prongs, the degree of projection of which is less than that of the marker.

3. Means for training beginners in the art of autogenous flame welding comprising a torch member provided at the extremity with a yielding marker and one or more prongs, substantially as described.

4. In a device of the character described, the combination of a torch member and a marker mounted at the extremity thereof.

5. In a device of the character described, the combination with a torch member, of a yielding marker projecting beyond the torch tip, and an adjacent projection positioned to contact with an underlying surface in event of lowering of the torch tip causing said marker to yield.

HENRY CAVE.